United States Patent
Müller et al.

(10) Patent No.: US 12,480,885 B2
(45) Date of Patent: Nov. 25, 2025

(54) MEASURING DEVICE FOR MEASURING AT LEAST ONE MEASURAND OF A MEDIUM

(71) Applicant: Endress+Hauser Conducta GmbH+Co. KG, Gerlingen (DE)

(72) Inventors: Andreas Müller, Ostfildern (DE); Hans Meyer, Eschach (DE); Matthias Großmann, Vaihingen-Enz (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 140 days.

(21) Appl. No.: 18/542,867

(22) Filed: Dec. 18, 2023

(65) Prior Publication Data

US 2024/0201094 A1 Jun. 20, 2024

(30) Foreign Application Priority Data

Dec. 20, 2022 (DE) .................. 10 2022 134 140.2

(51) Int. Cl.
*G01N 21/85* (2006.01)
*G01N 21/01* (2006.01)
(Continued)

(52) U.S. Cl.
CPC .......... *G01N 21/85* (2013.01); *G01N 21/645* (2013.01); *G01N 2021/0112* (2013.01);
(Continued)

(58) Field of Classification Search
CPC .............. G01N 21/85; G01N 21/645; G01N 2021/0112; G01N 2021/0193; G01N 2021/174; G01N 2021/1751; G01N 2021/6497; G01N 21/05; G01N 21/01; G01D 21/02; G01D 11/30; G01F 15/18
(Continued)

(56) References Cited

U.S. PATENT DOCUMENTS 10,429,307 B2 * 10/2019 Jagiella ............... G01J 3/108
2017/0285054 A1 * 10/2017 Muz ............... G01N 35/00623

FOREIGN PATENT DOCUMENTS

DE 3902755 A1 8/1990
DE 102011075530 A1 1/2012
(Continued)

*Primary Examiner* — Md M Rahman
(74) *Attorney, Agent, or Firm* — Christopher R. Powers; Endress+Hauser (USA) Holding, Inc.

(57) ABSTRACT

A measuring device for measuring a measurand of a medium includes a measuring cell, a measuring cell receptacle for holding the measuring cell, and a measuring apparatus for measuring the measurand, wherein the measuring cell includes a measurement chamber containing the medium and a reference chamber separate from the measurement chamber and containing a reference medium. The measurement chamber and the reference chamber are arranged relative to one another such that the measuring cell can be inserted into the measuring cell receptacle in a measuring position, in which measurements of the measurand of the medium can be performed by means of the measuring apparatus, and can be inserted into the measuring cell receptacle in a reference position, in which reference measurements of a reference variable of the reference medium in the reference chamber can be performed by means of the measuring apparatus.

17 Claims, 3 Drawing Sheets

(51) Int. Cl.
*G01N 21/17* (2006.01)
*G01N 21/64* (2006.01)

(52) U.S. Cl.
CPC ............... *G01N 2021/0193* (2013.01); *G01N 2021/174* (2013.01); *G01N 2021/1751* (2013.01); *G01N 2021/6497* (2013.01)

(58) Field of Classification Search
USPC ........................................................ 356/436
See application file for complete search history.

(56) References Cited

FOREIGN PATENT DOCUMENTS

| | | |
|---|---|---|
| DE | 102013101196 A1 | 9/2013 |
| DE | 102015013654 A1 | 4/2017 |
| DE | 112017005875 B4 | 7/2021 |
| WO | 2012062829 A1 | 5/2012 |

\* cited by examiner

MEASURING DEVICE FOR MEASURING AT LEAST ONE MEASURAND OF A MEDIUM

CROSS-REFERENCE TO RELATED APPLICATION

The present application is related to and claims the priority benefit of German Patent Application No. 10 2022 134 140.2, filed Dec. 20, 2022, the entire contents of which are incorporated herein by reference.

TECHNICAL FIELD

The present disclosure relates to a measuring device for measuring at least one measurand of a medium located in a measurement chamber of a measuring cell insertable or inserted in the measuring device or a medium flowing through the measurement chamber.

BACKGROUND

Measuring devices with measuring cells insertable therein, such as flow cells, are used in a plurality of different applications such as in chemistry, in biotechnology, and/or in the water industry, especially in water treatment systems, in sewage treatment plants, and/or in swimming pools, for measuring measurands of different types.

For measuring a measurand (e.g., a measured variable), these measuring devices include, for example, sensor components of a sensor which is designed to measure the measurand. Depending upon the type of sensor and/or the interaction with the medium used to measure the measurand, such as absorption, reflection, scattering, or fluorescence, different measurands can be measured with optical sensors. Examples known from the prior art include turbidity sensors for measuring turbidity of the medium, sensors for measuring a solids concentration in the medium, fluorescence sensors, and absorption sensors, such as sensors for measuring a spectral absorption coefficient or a concentration of an analyte in the medium.

DE 10 2013 101 196 A1 describes a measuring device designed as an optical inline sensor that includes a flow cell block made of stainless steel. The flow cell block includes a measurement chamber, arranged between a first outer wall and a second outer wall, opposite the first outer wall, of the flow cell block, for receiving the medium. On the outside of the first outer wall, a first housing is mounted in which a transmitting apparatus is arranged by means of which, during measuring mode, transmitted radiation is transmitted into the measurement chamber through a window inserted in the first outer wall. A second housing in which a detector is arranged is mounted on the outside of the second outer wall. The detector receives measuring radiation resulting from an interaction of the transmitted radiation along an optical path running through the medium located in the measurement chamber and emerging from a window inserted in the second outer wall, and provides a measuring signal, corresponding to the measuring radiation, on the basis of which signal a measuring result of the measurand of the medium can be determined.

In the inline sensor described in DE 10 2013 101 196 A1, the second housing is additionally equipped with swiveling calibration filters such as a density filter and a color filter. Each calibration filter can be pivoted from a measuring position, in which the respective calibration filter is outside the optical path, to a calibration position in which the respective calibration filter is inserted into the optical path.

These calibration filters offer the advantage that they can be used to perform calibration measurements with which the measuring characteristics of the measuring device can be checked. However, it is disadvantageous that the calibration measurements carried out with the calibration filters always also depend at least upon the medium present in the measurement chamber during the execution of these measurements. In order to avoid this dependence, the measurement chamber would have to be completely emptied and/or filled with a reference medium with known properties. Both, however, are generally associated with problems and/or an interruption of a process carried out at the place of use of the measuring device.

There are a large number of applications, such as applications in biotechnology, in which, for hygienic reasons and/or to avoid contamination, single use flow cells are used as disposable measuring cells. There is therefore the requirement for the most cost-effective manufacturability possible and the simplest possible handling and replaceability of these flow cells.

For this application, the flow cell block made of stainless steel described in DE 10 2013 101 196 A1 is disadvantageous, both because of the high manufacturing costs caused by the metal material and with regard to the assembly of the two housings.

WO 2012/062829 A1 describes a measuring device in which a replaceable disposable flow cell is arranged in an inner chamber of a housing, which includes two housing halves that are each open towards the disposable flow cell and are detachably connected to one another by several stud bolts. This measuring device includes a UV sensor which has a light source assembly detachably fastened to one of the housing halves and a detector assembly which is detachably fastened to the other housing half. In order to reduce the production costs, the disposable flow cell is designed as an injection-molded part, for example.

However, calibration measurements required for checking the measurement properties and/or the measurement accuracy cannot be readily carried out with this measuring device at the place of use of the measuring device (e.g., the measurement site).

SUMMARY

It is an object of the present disclosure to specify a measuring device of the type mentioned at the beginning, with which measurements can be carried out in a simple manner, by means of which the measuring properties and/or the measuring accuracy of the measuring apparatus can be checked, and/or by means of which the measuring device can be recalibrated and/or readjusted if necessary without these measurements being impaired by the medium in the measuring cell, and/or without the medium in the measuring cell having to be replaced or removed.

For this purpose, the present disclosure comprises a measuring device for measuring at least one measurand of a medium, having a measuring cell, a measuring cell receptacle for holding the measuring cell, and a measuring apparatus for measuring the measurand(s), wherein:
the measuring cell comprises a measurement chamber through which the medium can flow or which can be filled with the medium, and a reference chamber which is separate from the measurement chamber and fillable or filled with a reference medium, and
the measurement chamber and the reference chamber are arranged relative to one another in such a way that the measuring cell can be inserted into the measuring cell receptacle in a measuring position in which measurements of the measurand(s) of the medium located in the measurement chamber or flowing through the measurement chamber can be carried out by means of the measuring apparatus, and can be inserted into the measuring cell receptacle in a reference position in which reference measurements of at least one reference variable of the reference medium located in the reference chamber can be carried out by means of the measuring apparatus.

The measuring device offers the advantage that the reference measurements of the reference medium located in the reference chamber can be carried out independently of the medium located in the measurement chamber. The medium does not have to be removed from the measurement chamber or exchanged for a reference medium for this purpose. A further advantage is that position changes of the measuring cell from the measuring position to the reference position and vice versa are possible in each case by a simple repositioning of the measuring cell in the measuring cell receptacle. This offers the advantage that neither an at least partial disassembly of components of the measuring apparatus nor a complete removal of the measuring cell from the measuring device is required for this purpose.

A first embodiment provides that:
the measuring cell be designed in such a way that a measurement chamber axis extending through the measurement chamber of the measuring cell extends parallel to a reference chamber axis extending through the reference chamber of the measuring cell, and the reference chamber axis is spaced from the measurement chamber axis in a direction extending parallel to a longitudinal axis of the measuring cell by a distance and/or in a direction extending perpendicular to the longitudinal axis of the measuring cell by a distance, and/or
the measuring cell receptacle has an inner chamber, delimited by two side elements, arranged opposite each other, and a base element of the measuring cell receptacle, in which chamber the measuring cell is insertable or inserted into the measuring cell receptacle through an opening, opposite the base element, of the measuring cell receptacle.

An embodiment of the first embodiment provides that at least one of the two side elements have an opening which is arranged in such a way that the measurement chamber axis extends through the opening or a window inserted into the opening when the measuring cell is arranged in the measuring position in the measuring cell receptacle, and the reference chamber axis extends through the opening or the window inserted into the opening when the measuring cell is arranged in the reference position in the measuring cell receptacle.

A second embodiment provides that the measuring cell and the measuring cell receptacle, for example, the base element thereof, be designed in such a way that the measuring cell is arranged in the measuring receptacle in the measuring position at a measurement insertion depth specified for the measuring position, and is arranged in the reference position in the measuring receptacle at a reference insertion depth specified for the reference position, for example, a reference insertion depth different from the measurement insertion depth.

A third embodiment provides that an underside, facing a base element of the measuring cell receptacle when the measuring cell is inserted into the measuring cell receptacle, of the measuring cell, and an inner side, facing the measuring cell when the measuring cell is inserted into the measuring cell receptacle, of the base element, have shapes which are designed and matched to one another in such a way that they:
effect a form-fit connection between the measuring cell, arranged at the measuring insertion depth in the measuring cell receptacle, and the measuring cell receptacle, in particular the base element, when the measuring cell is inserted in the measuring position, and/or
effect a form-fit connection between the measuring cell, arranged in the measuring cell receptacle at the reference insertion depth, and the measuring cell receptacle, in particular the base element, when the measuring cell is inserted in the reference position.

A fourth embodiment provides that:
the measuring cell comprise, on its underside facing a base element of the measuring cell receptacle when the measuring cell receptacle is in the inserted state, plug-in connector elements, in particular plug-in connector elements formed as locating pins, as projections, as recesses, or as cutouts, in particular as blind holes, and
the base element comprise first plug-in connector elements arranged complementary to the plug-in connector elements of the measuring cell and arranged on an inner side of the base element, in particular first plug-in connector elements formed as cutouts, in particular as blind holes, as recesses, as projections, or as locating pins,
wherein the plug-in connector elements of the measuring cell are designed and arranged such that they engage in the first plug-in connector elements of the base element in a form-fit when the measuring cell is or is being inserted into the measuring cell receptacle in the measuring position,
wherein the measuring device is designed such that:
the plug-in connector elements of the measuring cell in cooperation with the first plug-in connector elements, complementary thereto, of the base element, effect a measuring insertion depth, specified for the measuring position, of the measuring cell in the measuring cell receptacle when inserting the measuring cell in the measuring position, and/or
the measuring cell and the measuring cell receptacle, either:
a) are designed in such a way that, when inserting the measuring cell in the reference position, the plug-in connector elements of the measuring cell interact with second plug-in connector elements of the base element, which are complementary to the plug-in connector elements of the measuring cell and are arranged offset with respect to the first plug-in connector elements of the base element, to effect a reference insertion depth, specified for the reference position, of the measuring cell in the measuring cell receptacle, or
b) are designed in such a way that, when inserting the measuring cell in the reference position, the measuring cell comprises a second set of plug-in connector elements, which is arranged offset relative to the plug-in connector elements of the measuring cell and, in cooperation with the first plug-in connector elements of the base element, effects a form-fit connection between the measuring cell and the measuring cell receptacle and/or the reference insertion depth, specified for the reference position, of the measuring cell in the measuring cell receptacle.

According to a fifth embodiment, the measuring device comprises a clamping device by means of which the measuring cell can be clamped in the measuring position and in the reference position in the measuring cell receptacle.

An embodiment of the fifth embodiment provides that the clamping device comprise a transverse clamping device with a clamping element and a counter bearing formed by a base element of the measuring cell receptacle,
- wherein the clamping element is designed in such a way that it can be moved into a starting position in which the clamping element releases the opening of the measuring cell receptacle in such a way that the measuring cell can be inserted through the opening into the measuring cell receptacle, and can be moved into a clamping position and is fixable or fixed, for example, releasably, in the clamping position by means of fastening means, in such a way that, when the measuring cell is inserted in the measuring position, the clamping element exerts a clamping force on the measuring cell in a direction facing the measurement chamber and extending perpendicular to the axis of the measurement chamber, and, when the measuring cell is inserted in the reference position, exerts a clamping force on the measuring cell in a direction facing the reference chamber and extending perpendicular to the reference chamber axis.

An embodiment of the latter embodiment provides that:
- the fastening means for fixing the clamping element in the clamping position comprise at least one mechanical latching device, at least one closing system, at least one locking system, and/or at least one screw which can be screwed into one of the side elements in each case through an end region of the clamping element, for example, a screw equipped with a rotary knob, and/or
- the clamping element:
  a) be designed as a bracket whose one end region is rotatably connected to one of the two side elements via a hinge, and whose end region opposite the hinge is fastened or fastenable in the clamping position to the other side element by the fastening means, or
  b) be designed as a cover whose two opposite end regions are each fastened or fastenable to one of the two side elements by the fastening means.

An embodiment of the fourth and/or fifth embodiment provides that the measuring cell comprise a spring system by means of which the measuring cell can be clamped in the measuring position by means of the clamping device in at least one clamping direction, relative to a measurement chamber axis of the measurement chamber, in the measuring cell receptacle, for example, a spring system which comprises at least one spring, which comprises at least one spring which is designed in each case as a transverse spring and by means of which the measuring cell can be clamped in the measuring cell receptacle in a transverse clamping direction extending perpendicular to the measurement chamber axis, and/or which comprises at least one spring which is designed in each case as an axial spring and by means of which the measuring cell can be clamped in the measuring cell receptacle in an axial clamping direction extending parallel to the measurement chamber axis.

An embodiment of the first embodiment provides that:
- the measurement chamber axis be spaced apart from the reference chamber axis, extending parallel thereto, in a direction extending parallel and perpendicular to the longitudinal axis of the measuring cell, and
- an upper side, facing away from the base element when inserted into the measuring cell receptacle, of a region, comprising the measurement chamber, of the measuring cell be arranged offset in a direction extending perpendicular to the longitudinal axis of the measuring cell with respect to an upper side of a region, comprising the reference chamber, of the measuring cell in such a way that a distance between the upper sides of the two regions in a direction extending perpendicular to the longitudinal axis of the measuring cell corresponds to the distance between the measurement chamber axis and the reference chamber axis in a direction extending perpendicular to the longitudinal axis of the measuring cell.

Another embodiment provides that the measuring cell be designed as a flow measuring cell, as a disposable measuring cell, and/or as an exchangeable measuring cell, have a measuring cell body manufactured from a plastic and/or from a sterilizable material, and/or comprise a measuring cell body designed in one piece and/or as an injection-molded part.

Another embodiment provides that:
a) the measuring device have a modular design such that its measuring apparatus comprises at least one module which is in each case fastenable or fastened on an outer side of one of the two side elements, or
b) the measuring device be designed as a sensor that comprises a sensor housing, wherein:
the sensor housing has at least one inner chamber in which at least one component of the measuring apparatus is arranged in each case, and
the sensor housing either has a cutout into which the measuring cell receptacle is insertable or inserted, or comprises the side elements and the base element of the housing regions forming the measuring cell receptacle.

Another embodiment provides that:
the measuring apparatus:
a) be designed as an optical measuring apparatus and/or as a measuring apparatus for measuring a turbidity of the medium, as a measuring apparatus for measuring a solid concentration contained in the medium, as a fluorescence measuring apparatus, or as an absorption measuring apparatus, in particular as a measuring apparatus for measuring a spectral absorption coefficient or a concentration of an analyte contained in the medium,
b) comprise a transmitting apparatus arranged on an outer side of a first of the two side elements of the measuring cell receptacle and designed to transmit transmitting radiation into the measurement chamber when the measuring cell is inserted into the measuring cell receptacle in the measuring position, and into the reference chamber when the measuring cell is inserted into the measuring cell receptacle in the reference position, and/or
c) comprise a detector arranged on an outer side of the second side element opposite the first side element, which detector is designed to receive measuring radiation emerging from the measurement chamber when the measuring cell is inserted into the measuring cell receptacle in the measuring position, and to determine and provide a measuring signal dependent upon the or each measurand, and to receive measuring radiation emerging from the reference chamber when the measuring cell is inserted into the measuring cell receptacle in the reference position, and to determine and provide a measuring signal dependent upon the or each reference variable,
wherein the measuring apparatus is designed such that it:
comprises an evaluation apparatus which is connected to the detector and determines and makes available a measurement result of the measurand(s) on the basis of the measurement signals determined by the detector when the measuring cell is inserted into the measuring cell receptacle in the measuring position, and determines and provides a measurement result of the reference variable(s) of the reference medium on the basis of the measurement signals determined by the detector when the measuring cell is inserted into the measuring cell receptacle in the reference position.

Another embodiment provides that:

the measuring cell consist overall of a transparent material, or, in each case in at least one or each of the two outer walls of the measurement chamber opposite one another along the measurement chamber axis:

a) a transparent window be inserted, or b) a window mount equipped with a window be insertable or inserted, wherein the window mount is insertable or inserted, in particular at an installation depth which can be selected from at least two different installation depths, into a cutout extending through the outer wall, and/or the window mount has, in particular, radially outward-projecting projections by means of which it is insertable or inserted at an installation depth which can be selected from at least two different installation depths into a cutout extending through the outer wall, wherein a wall of the measuring cell surrounding the cutout on the outside on all sides has on the inside for each selectable installation depth in each case a set of contact surfaces corresponding to the number of projections, wherein the contact surfaces of each set are arranged distributed around the cutout in the radial direction with respect to a longitudinal axis of the cutout in such a way that the projections of the window mount can be brought to rest on the contact surfaces of the respective set and are arranged in the axial direction in such a way that the window mount is arranged in the cutout at the installation depth assigned to the respective set of contact surfaces when the projections thereof rest on the contact surfaces of the respective set of contact surfaces.

Another embodiment provides that:

the reference medium be a liquid medium or a medium, formed as a solid, with known properties, with a known composition, and/or with a known value of each measurand, at least one or each of the two outer walls of the reference chamber opposite one another along the reference chamber axis consist of a transparent material in each case, or a transparent window be inserted into at least one or each of the two outer walls of the reference chamber, and/or the reference chamber:

a) be connected to at least one connection via which the reference medium can be introduced into the reference chamber and/or can be removed from the reference chamber, b) be designed as a chamber which is filled with the liquid reference medium in the factory and is then permanently closed, or c) have an opening through which the reference medium designed as a solid is insertable or inserted into the reference chamber.

Furthermore, the present disclosure comprises a measuring cell which can be inserted in a measuring device according to the present disclosure and has a measurement chamber through which the medium can flow or which can be filled with the medium, and a reference chamber separate from the measurement chamber and fillable or filled with a reference medium, wherein the measurement chamber and the reference chamber are arranged relative to one another in such a way that the measuring cell can be inserted in a measuring position into the measuring cell receptacle of the measuring device, in which measurements of the measurand(s) of the medium located in the measurement chamber or flowing through the measurement chamber can be carried out by means of the measuring apparatus of the measuring device, and in which reference measurements of at least one reference variable of the reference medium located in the reference chamber can be carried out by means of the measuring apparatus of the measuring device.

BRIEF DESCRIPTION OF THE DRAWINGS

The present disclosure and its advantages will now be explained in detail using the figures in the drawings, which show an exemplary embodiment, wherein.

The same elements are indicated by the same reference numbers in the figures.

DETAILED DESCRIPTION

Figure 1:
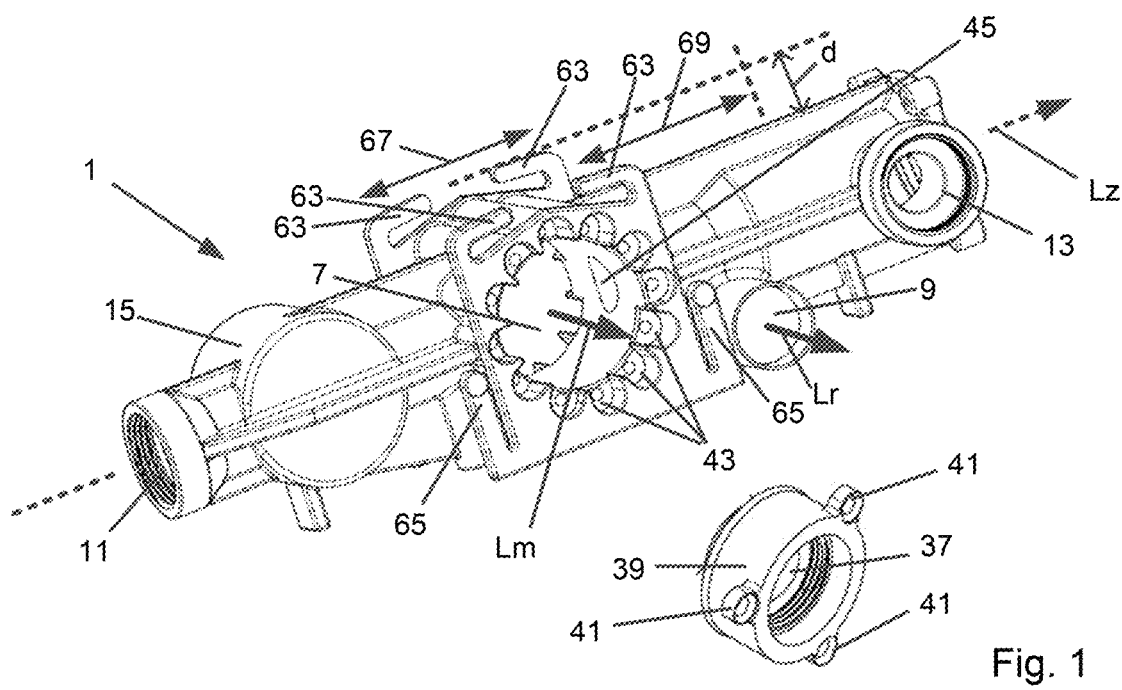
FIG. 1 shows an exploded perspective view of a measuring cell and a window mount insertable therein according to the present disclosure.
Figure 2:
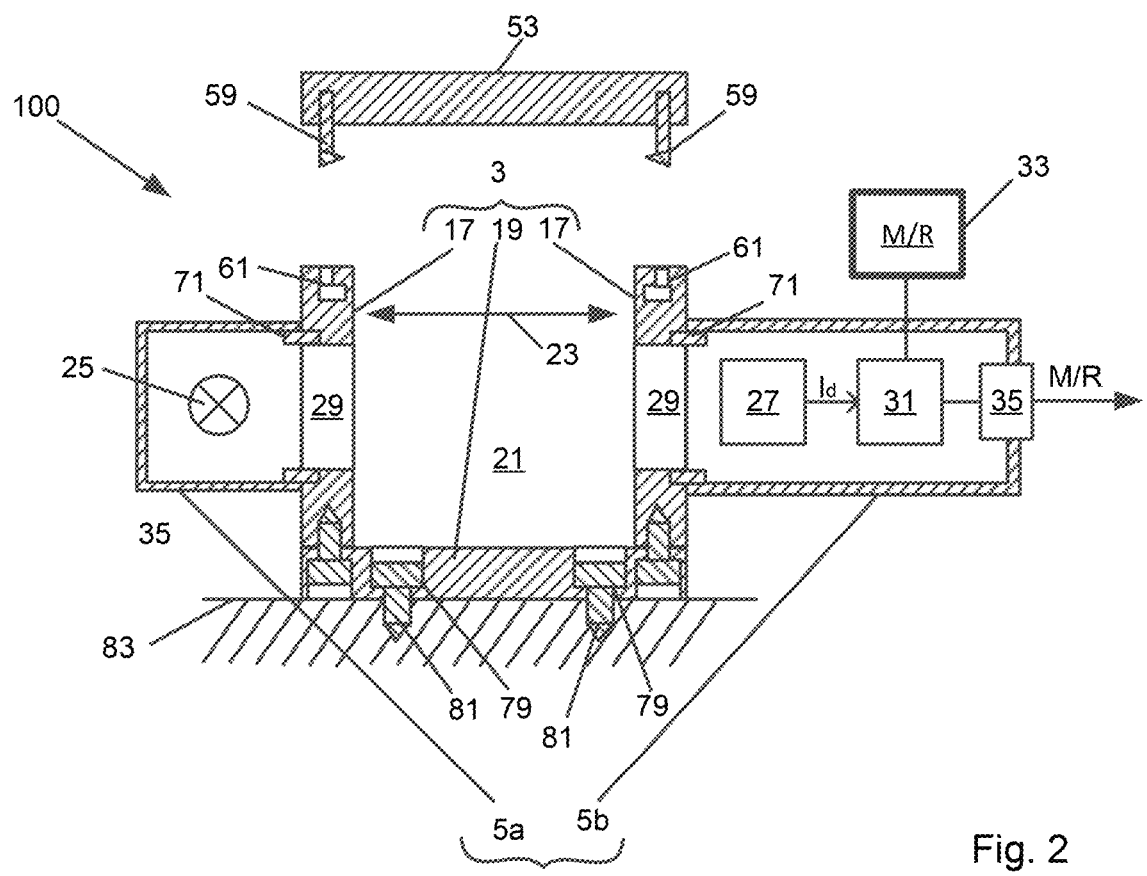
FIG. 2 shows cross-sectional schematic view of a modular measuring device with a measuring cell receptacle.
Figure 3:
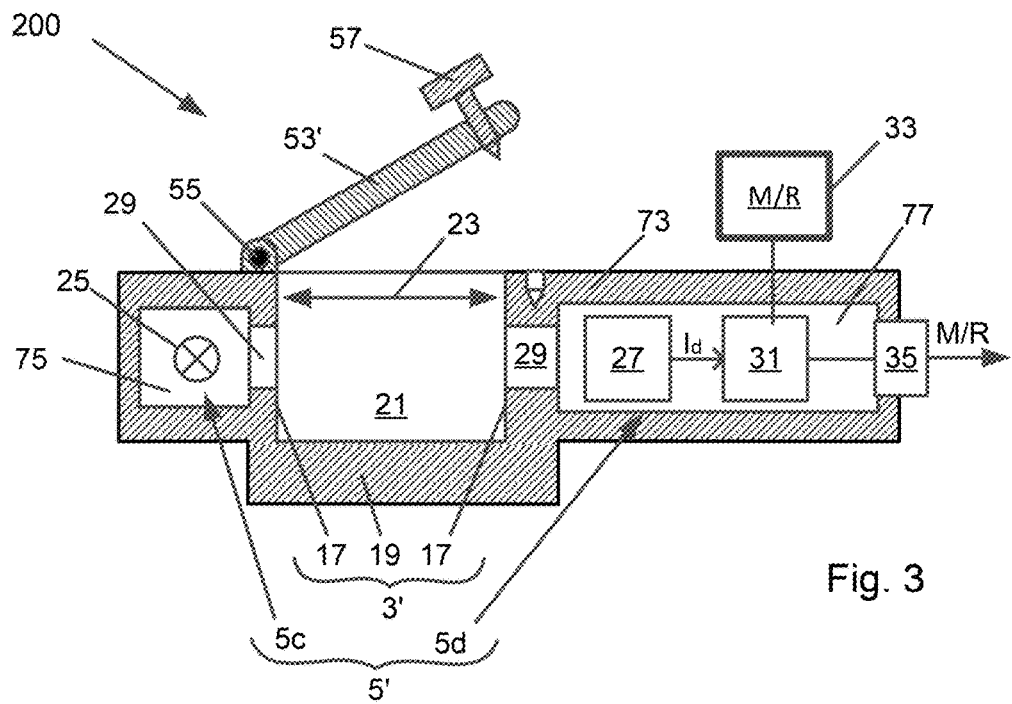
FIG. 3 shows a measuring device designed as a sensor.

The present disclosure comprises a measuring device 100, 200 for measuring at least one measurand (e.g., a measured variable) of a medium and a measuring cell 1 that can be inserted into the measuring device 100, 200. An exemplary embodiment of the measuring cell 1 is shown in FIG. 1. The measuring device 100, 200 comprises the measuring cell 1, a measuring cell receptacle 3, 3' for holding the measuring cell 1, and a measuring apparatus 5, 5' for measuring the measurand(s) of the medium. Exemplary embodiments of measuring devices 100, 200 in which a measuring cell, such as the measuring cell 1 shown in FIG. 1, can be inserted, are shown in FIGS. 2 and 3.

The measuring cell 1 comprises a measurement chamber 7 through which the medium can flow or which can be filled with the medium, and a reference chamber 9 which is separate from the measurement chamber 7 and is fillable or filled with a reference medium.

As shown in FIG. 1, the measuring cell 1 is designed as a flow cell, for example. For this purpose, it comprises an inlet 11 connected to the measurement chamber 7 and an outlet 13 connected to the measurement chamber 7. A supply line (not shown), via which the medium can be fed to the measurement chamber 7, can be connected to the inlet 11. A discharge line (not shown), via which the medium 1 can be removed from the measurement chamber 7, can be connected to the outlet 13.

The measuring cell 1 is designed, for example, as a disposable measuring cell. Alternatively, however, it can also be used as a reusable measuring cell for repeated use. In both cases, the measuring cell 1 is designed, for example, as an exchangeable component of the measuring device 100, 200.

Alternatively or additionally, the measuring cell 1 has, for example, a measuring cell body 15 made of a plastic and/or a sterilizable material. The measuring cell body 15 is designed, for example, as a single-piece body which surrounds a cavity forming the measurement chamber 7 and a cavity which is separate therefrom and forms the reference chamber 9. A particular embodiment provides that the measuring cell 1 or the measuring cell body 15 forming the measuring cell 1 be designed as an injection-molded part. The latter is advantageous in particular in conjunction with measuring cells 1 designed and/or used as a disposable measuring cell because large quantities of measuring cells 1 can be cost-effectively produced using a single injection mold.

A liquid medium or a medium, formed as a solid, with known properties, with a known composition, and/or with a known value of each measurand, is especially suitable as reference medium. In conjunction with liquid reference media, the reference chamber 9 is also optionally connected, for example, to at least one connection via which the reference medium can be introduced into the reference chamber 9 and/or can be removed from the reference chamber 9. This offers the advantage that the reference medium can be replaced if required. Alternatively, however, the reference chamber 9 can also be designed as a chamber which is filled with the liquid reference medium at the manufacturing site and is then permanently closed. In conjunction with reference media designed as a solid body, the reference chamber 9 has, for example, an opening through which the solid body can be inserted into the reference chamber 9. This variant also offers the advantage that the reference medium can be exchanged if required.

The measurement chamber 7 and the reference chamber 9 are arranged relative to one another in such a way that the measuring cell 1 can be inserted into the measuring cell receptacle 3, 3' in a measuring position in which measurements of the measurand(s) of the medium located in the measurement chamber 7 or flowing through the measurement chamber 7 can be performed by means of the measuring apparatus 5, 5', and can be inserted into the measuring cell receptacle 3, 3' in a reference position in which reference measurements of at least one reference variable of the reference medium located in the reference chamber 9 can be carried out by means of the measuring apparatus 5, 5'.

For this purpose, the measuring cell receptacles 3, 3' shown as examples in FIGS. 2 and 3 each have, for example, an inner chamber 21, at least partially delimited by two side elements 17, arranged opposite one another, and by a base element 19 of the measuring cell receptacle 3, 3', in which chamber 21 the measuring cell 1 is insertable or inserted into the measuring cell receptacle 3, 3' through an opening 23, opposite the base element 19, of the measuring cell receptacle 3, 3'.

Figure 4:
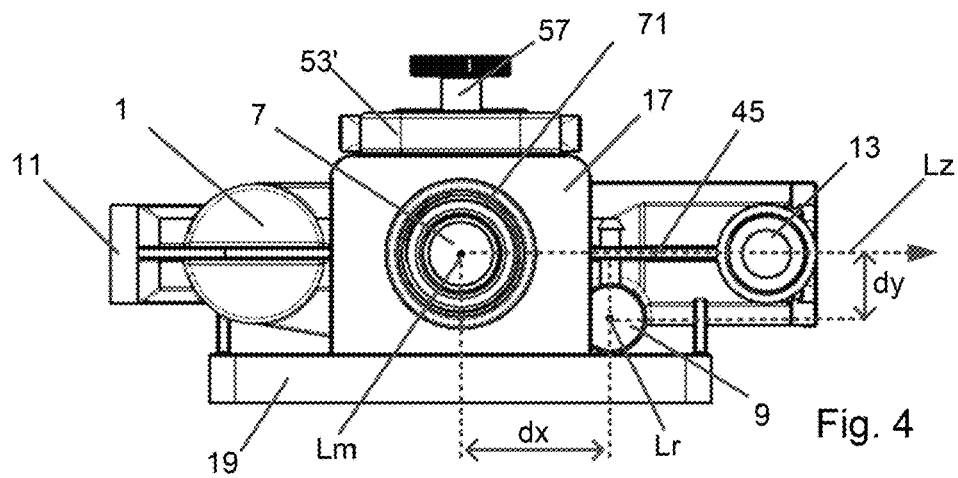
FIG. 4 shows the measuring cell receptacle of FIG. 2 together with a measuring cell inserted therein in a measuring position.
Figure 5:
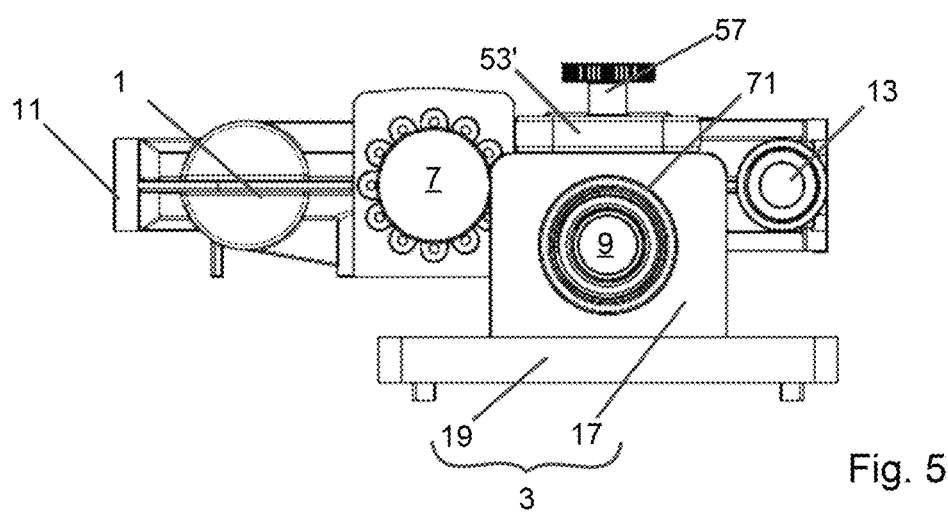
FIG. 5 shows the measuring cell receptacle of FIG. 2 with a measuring cell inserted therein in a reference position.

FIG. 4 shows the measuring cell receptacle 3 (e.g., a side element 17 and the base element 19) of FIG. 2 together with the measuring cell 1 inserted in the measuring position therein. FIG. 5 shows the measuring cell receptacle 3 of FIG. 2 together with the measuring cell 1 inserted in the reference position.

An optical measuring apparatus, such as a measuring apparatus for measuring a turbidity of the medium, a measuring apparatus for measuring a solid concentration contained in the medium, a fluorescence measuring apparatus, or an absorption measuring apparatus, e.g., a measuring apparatus for measuring a spectral absorption coefficient or a concentration of an analyte containing in the medium, is especially suitable as the measuring apparatus 5, 5'.

The measuring apparatuses 5, 5' shown in FIGS. 2 and 3 as an example each comprise a transmitting apparatus 25 and a detector 27. The transmitting apparatus 25 is arranged on an outer side of a first of the two side elements 17 outside the inner chamber 21 and is designed to transmit transmitted radiation through an opening 29 provided in the first side element 17 or a window inserted into this opening 29 into the inner chamber 21. For this purpose, the transmitting apparatus 25 comprises, for example, at least one radiation source, e.g., a light source, a UV light source, an IR light source, and/or a light-emitting diode.

The opening 29 in the first side element 17 is arranged in such a way that the transmitted radiation enters the measurement chamber 7 in the direction of a measurement chamber axis Lm running through the measurement chamber 7 of the measuring cell 1 when the measuring cell 1 is inserted into the measuring cell receptacle 3 in the measuring position, and enters the reference chamber 9 in the direction of a reference chamber axis Lr running through the reference chamber 9 of the measuring cell 1 when the measuring cell 1 is inserted into the measuring cell receptacle 3, 3' in the reference position.

The detector 27 is arranged on an outer side of the second side element 17 opposite the first side element 17 outside the inner chamber 21 and is designed to receive measurement radiation exiting the inner chamber 21 through an opening 29 provided in the second side element 17 or a window inserted into this opening 29, and to determine and make available a measurement signal $I_d$ corresponding to the measurement radiation.

In this case, with the measuring cell 1 inserted into the measuring cell receptacle 3, 3' in the measuring position, the measuring radiation is, for example, a measuring radiation resulting from an interaction, such as absorption, reflection, scattering, or fluorescence, of the transmitted radiation with the medium and emerging from the measurement chamber 7 in a direction running parallel to the measurement chamber axis Lm. Accordingly, the measurement signal $I_d$ is a measurement signal $I_d$ dependent upon the or each measurand in the measuring cell 1 inserted into the measuring cell receptacle 3, 3' in the measuring position.

Analogously, when the measuring cell 1 is inserted into the measuring cell receptacle 3, 3' in the reference position, the measuring radiation is, for example, a measuring radiation resulting from an interaction, such as absorption, reflection, scattering, or fluorescence, of the transmitted radiation with the reference medium and emerging from the reference chamber 9 in parallel to the reference chamber axis Lr. Accordingly, the measuring signal $I_d$ is a measuring signal $I_d$ dependent upon the or each reference variable when the measuring cell 1 is inserted into the measuring cell receptacle 3, 3' in the reference position.

Depending upon the embodiment, the measuring apparatus 5, 5' can optionally comprise, for example, at least one further sensor component, such as the evaluation apparatus 31 shown in FIGS. 2 and 3, which is connected to the detector 27. The evaluation apparatus 31 is designed, for example, to determine a measurement result M of the measurand(s), when the measuring cell 1 is inserted in the measurement position into the measuring cell receptacle 3, 3', on the basis of the measurement signals $I_d$ output by the detector 33. The measurement result M is displayed, for example, via a display 33 connected to the evaluation apparatus 31 and/or output via an interface 35 connected to the evaluation apparatus 31 in the form of measured values, in the form of measurement signals, and/or in another way, and/or provided in a readable form. Alternatively or in addition thereto, the evaluation apparatus 31 is designed, for example, to determine a measurement result R of the reference variable(s) of the reference medium, when the measuring cell 1 is inserted in the reference position into the measuring cell receptacle 3, 3', on the basis of the measurement signals $I_d$ output by the detector 27. Just like the measurement result M of the measurand(s), the measurement result R of the reference variable(s) is also displayed, for example, via the display 33 and/or is output via the interface 35 in the form of measured values, in the form of measurement signals, and/or in another way, and/or provided in a readable form.

The measurement signals $I_d$ output by the detector 27, which are dependent upon the reference variable(s) of the reference medium, as well as, of course, also the measurement result R of the reference variable(s) which can be determined therefrom or by means of the evaluation apparatus 31, make it possible to check the measurement properties, in particular the measurement accuracy, of the measuring apparatus 5, 5', by means of which the measurement properties and/or the measurement accuracy of the measuring device 100, 200 can be checked and/or validated, for example. In addition, calibration data are available via the measurement signals $I_d$ and/or the measurement result R of the reference variable(s), on the basis of which recalibration and/or readjustment of the measuring device 100, 200, in particular its measuring apparatus 5, 5', can be carried out and/or executed if required.

The present disclosure is not limited to the shown measuring apparatuses 5, 5'. Alternatively, instead of the measuring apparatus 5, 5' shown here as an example, another measuring apparatus can be used in the measuring device 100, 200 for measuring at least one of the previously mentioned measurands, and/or for measuring at least one measurand different from the previously mentioned measurands. Analogously to the exemplary embodiments shown here, in particular measuring apparatuses are suitable for this purpose which comprise at least one or each sensor component for measuring the measurand(s).

Depending upon the embodiment of the measuring apparatus 5, 5', here as well, at least one of the two side elements 17 has the opening 29 shown in each of FIGS. 2 and 3, if required. As can be seen from FIGS. 1-5, these opening(s) 29 are each arranged, for example, in such a way that the measurement chamber axis Lm runs through the respective opening 29 or a window inserted into the opening 29 when the measuring cell 1 is arranged in the measuring position in the measuring cell receptacle 3, 3', and the reference chamber axis Lr runs through the respective opening 29 or a window inserted into the opening 29 when the measuring cell 1 is arranged in the reference position in the measuring cell receptacle 3, 3'.

In measuring devices 100, 200 whose measuring apparatus 5, 5' is designed as an optical measuring apparatus and/or whose measuring apparatus 5, 5' comprises the transmitting apparatus 25 and/or the detector 27, at least one or each of the two outer walls of the measurement chamber 7 opposite one another along the measurement chamber axis Lm consists of a transparent material. For this purpose, the measuring cell 1 as a whole can consist of a transparent material. Alternatively, a transparent window can be inserted into at least one of, or each of, the two outer walls of the measurement chamber 7. For example, windows that are glued or pressed into the respective outer wall are suitable as windows.

FIG. 1 shows an alternative embodiment in which a window mount 39 equipped with a window 37 and shown as a separate component in FIG. 1 is inserted into a cutout running through the respective outer wall. The window mounts described in the German patent application DE 102022130221.0, filed Nov. 15, 2022, and incorporated herein by a reference, are particularly suitable for this purpose. As shown in FIG. 1, these window mounts 39 each have radially outward-projecting projections 41, by means of which they can be inserted into the respective cutout at an installation depth which can be selected from at least two different installation depths. For this purpose, a wall of the measuring cell 1 surrounding this cutout on the outside on all sides has, on the inside, for each selectable installation depth, in each case one set of contact surfaces 43 corresponding to the number of projections. The contact surfaces 43 of each set are arranged with respect to a longitudinal axis of the cutout in a radial direction distributed around the cutout in such a way that the projections 41 of the window mount 39 can be brought to rest on the contact surfaces 43 of the respective set and, in an axial direction, arranged in such a way that the window mount 39 is arranged in the cutout at the installation depth associated with the respective set of contact surfaces 43 when the projections 41 thereof lie against the contact surfaces 43 of the respective set of contact surfaces 43. These window mounts 39 offer the advantage that a path length of an optical path running through the measurement chamber 7 can be adjusted via their installation depth.

Analogously, at least one or each of the two outer walls of the reference chamber 9 opposite each other along the reference chamber axis Lr consists of a transparent material, especially in connection with liquid reference media. For this purpose as well, the measuring cell 1 as a whole can be made of a transparent material, or a transparent window can be inserted into at least one or each of the two outer walls of the reference chamber 9.

In connection with reference media designed as solids, at least one or each of the two outer walls of the reference chamber 9 opposite each other along the reference chamber axis Lr can alternatively each have an opening. In this case, the reference chamber 9 is formed, for example, as a channel open at least at one end in a direction running parallel to the reference chamber axis Lr.

The measuring devices 100, 200 have the aforementioned advantages. Individual components of the measuring device 100, 200, in particular the measuring cell 1, the measuring cell receptacle 3, 3', and/or the measuring apparatus 5, 5', can each have configurations that can be used individually and/or in combination with one another.

As described above, the measurement chamber 7 and the reference chamber 9 are separate from one another. They are therefore spaced apart from one another within the measuring cell 1. Furthermore, they are preferably aligned in such a way that the measurement chamber axis Lm running through the measurement chamber 7 of the measuring cell 1 runs parallel to the reference chamber axis Lr running through the reference chamber 9 of the measuring cell 1.

In principle, it is sufficient if the measurement chamber 7 and the reference chamber 9 are arranged offset relative to one another in such a way that the reference chamber axis Lr is spaced apart from the measurement chamber axis Lm, running parallel thereto, in a direction running parallel to a longitudinal axis Lz of the measuring cell 1 by a distance dx, and/or in a direction running perpendicular to the longitudinal axis Lz of the measuring cell 1 by a distance dy. In this case, the existing distance dx running in the direction parallel to the longitudinal axis Lz of the measuring cell 1, the existing distance dy running in the direction perpendicular to the longitudinal axis Lz of the measuring cell 1, or each of the two distances dx and dy is in each case dimensioned such that the measurement chamber 7 is completely separate from the reference chamber 9.

FIGS. 1, 4, and 5 show an exemplary embodiment in which the reference chamber axis Lr is spaced apart from the measurement chamber axis Lm in a direction running parallel to the longitudinal axis Lz of the measuring cell 1 by a distance dx shown in FIG. 4, and in a direction running perpendicular to the longitudinal axis Lz of the measuring cell 1 by a distance dy shown in FIG. 4. In the shown example, the reference chamber 9 is arranged on the side, facing the outlet 13, of the measurement chamber 7. Correspondingly, the existing distance dy running in the direction perpendicular to the longitudinal axis Lz of the measuring cell 1 offers, if this distance dy is correspondingly dimensioned, the advantage that a channel 45 connecting the measurement chamber 7 to the outlet 13 can be or is formed as a substantially straight connecting line. Alternatively, the reference chamber 9 can be arranged on the side, facing the inlet 11, of the measurement chamber 9. In this case, the existing distance dy running in the direction perpendicular to the longitudinal axis Lz of the measuring cell 1 offers, if this distance dy is correspondingly dimensioned, the advantage that a channel connecting the measurement chamber 7 to the inlet 11 can be or is formed as a substantially straight connecting line.

The measuring cell 1 and the measuring cell receptacle 3, 3', in particular their base element 19, are preferably designed in such a way that the measuring cell 1 is arranged in the measuring receptacle 3, 3' in the measuring position at a measuring insertion depth specified for the measuring position, and is arranged in the measuring receptacle 3, 3' in the reference position at a reference insertion depth specified for the reference position, in particular a reference insertion depth different from the measuring insertion depth.

At least one embodiment provides that an underside, facing the base element 19 of the measuring cell receptacle 3, 3' when the measuring cell 1 is inserted into the measuring cell receptacle 3, 3', of the measuring cell 1, and the inside, facing the inserted measuring cell 1 when the measuring cell 1 is inserted, of the base element 19 have shapes which are designed and matched to one another in such a way that, when the measuring cell 1 is inserted in the measuring position, they effect a form-fit connection between the measuring cell 1, arranged at the measuring insertion depth in the measuring cell receptacle 3, and the base element 19. Alternatively or additionally, the shapes are preferably designed and matched with one another in such a way that, when the measuring cell 1 is inserted in the reference position, they effect a form-fit connection between the measuring cell 1, arranged at the reference insertion depth in the measuring cell receptacle 3, 3', and the base element 19.

In this case, the form-fit connections in the measuring position and in the reference position can each be achieved in a wide variety of ways, e.g., via corresponding contact surfaces and/or interlocking regions, such as, for example, projections and/or recesses, of measuring cell 1 and/or measuring cell receptacle 3, 3', and their base element 19.

One embodiment consists in the measuring cell 1 comprising, on its underside facing the base element 19 of the measuring cell receptacle 3, 3' when the measuring cell receptacle 3, 3' is in the inserted state, distributedly arranged plug-in connector elements 47, in particular plug-in connector elements designed as locating pins or as cutouts, which are designed and arranged in such a way that they engage in a form-fit in first plug-in connector elements 49 of the base element 19, which are complementary thereto and are arranged distributed on an inner side of the base element 19, when the measuring cell 1 is inserted into the measuring cell receptacle 3 in the measuring position.

Figure 6:
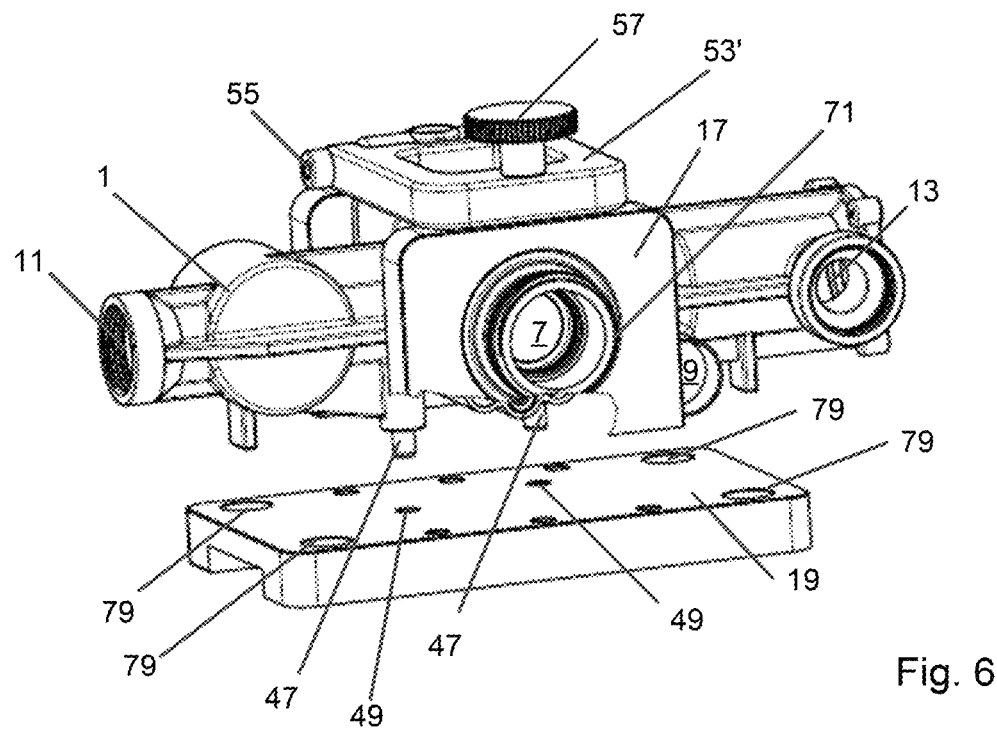
FIG. 6 shows an exploded perspective view of a partially sectional view of the measuring cell inserted into the measuring cell receptacle in the measuring position in FIG. 4.

This embodiment offers the advantage that, via the distribution of the plug-in connector elements 47 of the measuring cell 1 and the corresponding distribution of the first plug-in connector elements 49, complementary thereto, of the base element 19, a precise positioning of the measuring cell 1 in the measuring position, which can be felt during insertion, is ensured. Furthermore, they offer the advantage that they bring about additional fixing of the measuring cell 1 in the measuring position. FIG. 6 shows, as an exemplary embodiment in this regard, an exploded view of a partially sectional view of the measuring cell 1 shown in FIG. 4, which is inserted into the measuring cell receptacle 3 in the measuring position, in which the plug-in connector elements 47 of the measuring cell 1 are designed as outwardly-projecting locating pins, and the first plug-in connector elements 49 of the base element 19 are designed as cutouts, such as blind holes, which receive the locating pins.

In this case, the measuring cell 1 and the measuring cell receptacle 3, 3', in particular their base element 19, are preferably also designed here in such a way that the measuring cell 1 is arranged in the measuring receptacle 3, 3' in the measuring position at the measuring insertion depth specified for the measuring position, and is arranged in the measuring receptacle 3 in the reference position at the reference insertion depth specified for the reference position, in particular a reference insertion depth different from the measuring insertion depth. As shown in FIGS. 4 and 6, this can be achieved, for example, by the plug-in connector elements 47 of the measuring cell 1 and the first plug-in connector elements 49, complementary thereto, of the base element 19 being designed to effect a measurement insertion depth, specified for the measuring position, of the measuring cell 1 in the measuring cell receptacle 3 when the measuring cell 1 is inserted in the measuring position.

One embodiment provides that the plug-in connector elements 47 of the measuring cell 1 be at the same time also designed to effect the reference insertion depth, specified for the reference position, of the measuring cell 1 in the measuring cell receptacle 3 when the measuring cell 1 is inserted in the reference position in cooperation with the base element 19.

Figure 7:
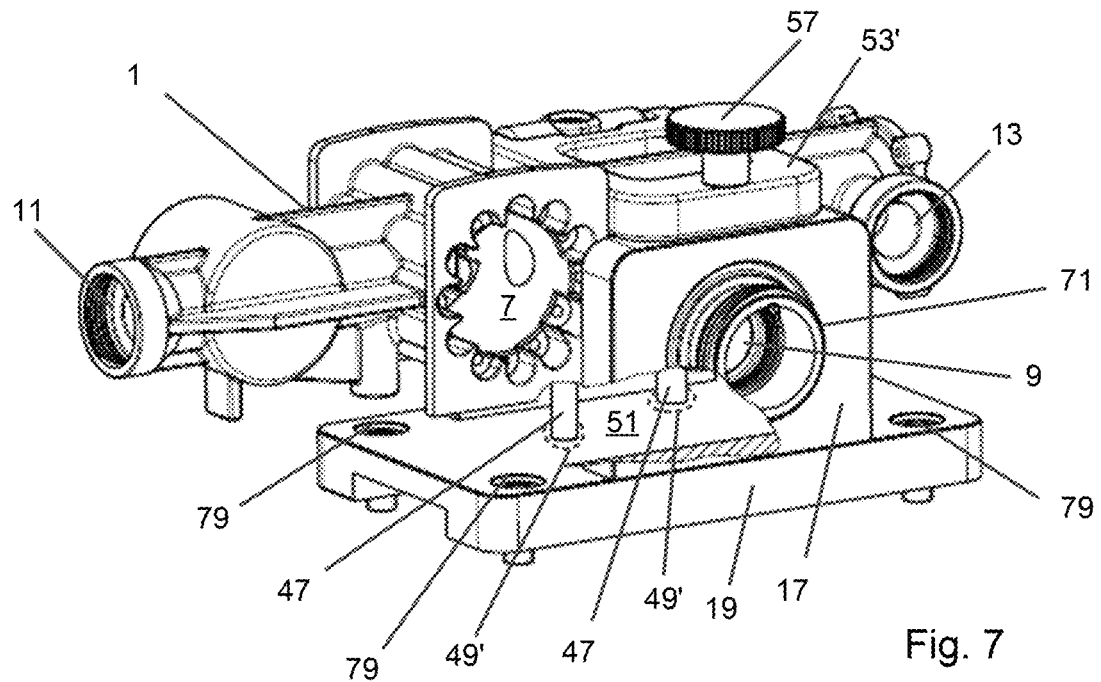
FIG. 7 shows a partially sectional perspective view of the measuring cell inserted into the measuring cell receptacle in the reference position in FIG. 5.

FIG. 7 shows, as an example, a partially sectional view of the measuring cell 1 shown in FIG. 5 and inserted into the measuring cell receptacle 3 in the reference position. In FIG. 7, the length of the plug-in connector elements 47 of the measuring cell 1, which are also designed here as locating pins, is dimensioned such that the measuring cell 1 is located in measuring receptacle 3 at the reference insertion depth specified for the reference position when the locating pins are arranged on a surface 51 of the base element 19.

Alternatively, in addition to the first plug-in connector elements 49, the base element 19 can have second plug-in connector elements 49', arranged offset from the first plug-in connector elements 49, and also designed as cutouts, especially as blind holes, shown as an alternative in dashed lines in FIG. 7 and into which the plug-in connector elements 47 of the measuring cell 1, which are designed as locating pins, are inserted when the measuring cell 1 is inserted in the reference position. In this variant, a length of the plug-in connector elements 47 of the measuring cell 1, which are designed as locating pins, a depth of the first plug-in connector elements 49 of the base element 19 which are designed as cutouts, and a depth of the second plug-in connector elements 49' of the base element 19 which are designed as cutouts, are dimensioned in such a way that the measuring cell 1 is located at the measuring insertion depth, specified for the measuring position, in the measuring cell receptacle 3 when the plug-in connector elements 47 of the measuring cell 1 are inserted into the first plug-in connector elements 49, and the measuring cell 1 is located at the reference insertion depth, specified for the reference position, in the measuring cell receptacle 3 when the plug-in connector elements 47 of the measuring cell 1 are inserted into the second plug connector elements 49' of the base element 19.

An alternative equivalent to this embodiment is that the base element has plug-in connector elements designed as locating pins, and the measuring cell has on its underside a first set of plug-in connector elements designed as cutouts, in particular as blind holes, into which the locating pins of the base element extend when the measuring cell is inserted in the measuring position. In this variant, the measuring cell comprises, for example, an underside region which rests on the plug-in connector elements of the base element designed as locating pins when the measuring cell is or is being inserted into the measuring cell receptacle in the reference position. Alternatively, the measuring cell comprises, for example, a second set of plug-in connector elements designed as cutouts, e.g., as blind holes, which are arranged offset relative to the first set of plug-in connector elements and into which the locating pins of the base element extend in the reference position when the measuring cell is inserted. In this case, a length of the locating pins of the base element, a depth of the first set of plug-in connector elements of the measuring cell designed as cutouts, and a depth of the second set of plug-in connector elements of the measuring cell designed as cutouts are dimensioned such that the measuring cell is arranged in the measuring position and in the reference position at the insertion depth, specified for the respective measuring cell position, in the measuring cell receptacle.

Alternatively, instead of the locating pins and blind holes shown in the figures, however, other means for exact positioning and fixing of the measuring cell 1 can also be used in the measurement position and in the reference position, such as projections, and recesses complementary thereto. The projections and the recesses are designed, for example, as mutually complementary plug-in connector elements of the measuring cell and base element. In this context, the base element can have, for example, two sets of plug-in connector elements arranged offset from one another, one of which, in cooperation with the plug-in connector elements of the measuring cell, effects the form-fit connection and/or the measuring insertion depth when inserted in the measuring position, and the other of which, in cooperation with the plug-in connector elements of the measuring cell, effects the form-fit connection and/or the reference insertion depth when the measuring cell is inserted in the reference position. Alternatively, the measuring cell can have, for example, two sets of plug-in connector elements arranged offset to one another, one of which, in cooperation with the first plug-in connector elements of the base element, effects the form-fit connection and/or the measuring insertion depth when the measuring cell is inserted in the measuring position, and the other of which, in cooperation with the first plug-in connector elements of the base element, effects the form-fit connection and/or the reference insertion depth when the measuring cell is inserted in the reference position.

Alternatively or additionally, the measuring cell and/or the measuring cell receptacle have contact surfaces, for example, via which a form-fit connection between the measuring cell 1 and the measuring cell receptacle 3, and their base element 19, is achieved in the measuring position and in the reference position.

An embodiment that can be used alternatively or in addition to the embodiments described above consists in the measuring device 100, 200 comprising a clamping device by means of which the measuring cell 1 is clampable or clamped in the measuring position in the measuring cell receptacle 3, 3'. Clamping devices that can be used for this purpose are described in the German patent application DE 102022130906.1, filed by the applicant Nov. 22, 2022, which is incorporated herein by reference.

As described in DE 102022130906.1, the clamping devices shown in FIGS. 2-7 also each comprise a transverse clamping device, for example, which comprises a clamping element 53, 53' and a counter bearing formed by the base element 19. The clamping element 53, 53' is designed such that it can be moved into a starting position in which the clamping element 53, 53' releases the opening 23 of the measuring cell receptacle 3, 3' in such a way that the measuring cell 1 can be inserted into the measuring cell receptacle 3, 3' through the opening 23. In addition, the clamping element 53, 53' is designed in such a way that it can be moved into a clamping position and can be fixed in the clamping position in such a way that, when the measuring cell 1 is inserted in the measuring position, the clamping element 53, 53' exerts a clamping force on the measuring cell 1 acting in the direction facing the measurement chamber 7 and running perpendicular to the measurement chamber axis Lm. One embodiment provides that the clamping device comprise fastening means, such as one or more screws, at least one mechanical latching device, at least one closure system, and/or at least one locking system, by means of which the clamping element 53, 53' can be fixed in the clamping position, e.g., in a detachable manner.

FIGS. 3-7 show an embodiment in which the clamping element 53' is designed as a bracket, the one end region of which is rotatably connected to a first one of the two side elements 19 via a hinge 55, and which, in the clamping position, can be fastened in the clamping position by means of a screw 57 screwed into the second side element 17 through an end region, facing away from the hinge 55, of the clamping element 53'. The screw 57 is preferably equipped with a rotary knob with which the screw 57 can be screwed in and out without a tool.

FIG. 2 shows an alternative embodiment in which the clamping element 53 is designed as a cover whose two opposite end regions can each be fastened by fastening means to the end faces, facing away from the base element 19, of the side elements 17. For this purpose, fastening means are suitable, for example, which comprise at least two devices 59 arranged on the two opposite end regions of the clamping element 53, which devices preferably automatically connect, in particular in a form-fit and/or force-fit, to complementary devices 61 provided on the two side elements 17 when the clamping element 53 is moved into the clamping position. Suitable devices 59 of the clamping element 53 are, for example, latching elements which, when the clamping position is reached, latch into complementary devices 61 provided in the side elements 17 and formed as receptacles when the clamping element 53 is moved into the clamping position.

The clamping effect effected by the clamping device of the measuring device 100, 200 can optionally also be reinforced in that the measuring cell 1 comprises a spring system by means of which the measuring cell 1 can be clamped by the clamping device in the measuring cell receptacle 3, 3'. Spring systems, comprising at least one spring that can be tensioned by means of the clamping device, that can be used for this purpose are also described in DE 102022130906.1.

Such a spring system shown as an option in FIG. 1 comprises, for example, at least one spring 63 designed as a transverse spring and by means of which the measuring cell 1 can be clamped in the measuring position by means of the transverse clamping device in a transverse clamping direction running perpendicular to the measurement chamber axis Lm in the measuring cell receptacle 3, 3. Alternatively or in addition thereto, this spring system comprises, for example, at least one spring 65 designed as an axial spring and by means of which the measuring cell 1 in the measuring position can be clamped in the measuring cell receptacle 3, 3' in an axial clamping direction running in parallel with the measurement chamber axis Lm. In this case, the clamping device comprises an axial clamping device for clamping each spring 65 designed as an axial spring. As described in DE 102022130906.1, a suitable axial clamping device is, for example, one formed by the two side elements 17 and whose spacing is dimensioned such that the side elements 17 exert a parallel to the measurement chamber axis Lm from the outside on each spring 65, designed as an axial spring, of the measuring cell 1 inserted into the measuring cell receptacle 3, 3' in the measuring position.

FIGS. 5 and 7 show the measuring cell 1 shown in FIG. 1 without the spring system, which is also optional in FIG. 1.

Regardless of whether or not the measuring cell 1 comprises the spring system, the measuring cell 1, as shown in FIGS. 5 and 7, is preferably designed such that the measuring cell 1 can also be clamped in the reference position by means of the clamping device in the measuring cell receptacle 3, 3'. In the exemplary embodiments shown here, in which the measurement chamber axis Lm is spaced apart from the reference chamber axis Lr, running parallel thereto, in a direction parallel and perpendicular to the longitudinal axis Lz of the measuring cell 1, this is brought about, for example, by an at least sectionally stepped shape of the measuring cell body 15. In this case, an upper side, facing away from the base element 19 in the state inserted into the measuring cell receptacle 3, 3', of a region 67, comprising the measurement chamber 7, of the measuring cell 1 is arranged offset in the direction running perpendicular to the longitudinal axis Lz of the measuring cell 1 with respect to an upper side, facing away from the base element 19 in the state inserted into the measuring cell receptacle 3, 3', of a region 69, comprising the reference chamber 9, of the measuring cell 1. This offset shown in FIG. 1 by a double arrow d is preferably dimensioned such that the distance d between the upper sides of the two regions 67, 69 in the direction perpendicular to the longitudinal axis Lz of the measuring cell 1 corresponds to the distance dy of the measurement chamber axis Lm from the reference chamber axis Lr in a direction running perpendicular to the longitudinal axis Lz of the measuring cell 1.

Alternatively or in addition to the embodiments described above, the measuring device 100, 200 can also be designed overall in different ways.

In the exemplary embodiment shown in FIG. 2, the measuring device 100 is of modular design. For this purpose, the measuring apparatus 5 has, for example, at least one module 5a, 5b, such as the module 5a, shown in FIG. 2, comprising the transmitting apparatus 25, and/or the module 5b shown in FIG. 2, comprising the detector 27, which module is in each case attachable or fastened on an outer side of one of the two side elements 17. As shown in FIG. 2 and FIGS. 4-7, the, or each, side element 17 has, for this purpose, on its outer side in each case a fastening device 71 such as a threaded connector, to which a fastening device, complementary thereto, of the module 5a, 5b mountable on the respective side element 17 is connectable or connected—in particular, detachably.

FIG. 3 shows an alternative embodiment in which the measuring device 200 is designed as a sensor. This measuring device 200 differs from the measuring device 100 shown in FIG. 2 in that the measuring cell receptacle 3' is designed as a component of the sensor. In FIG. 3, the side elements 17 and the base element 19 of the measuring cell receptacle 3' are, for this purpose, each formed by a housing region of a sensor housing 73 of the sensor. Alternatively, however, a modification of the measuring device 200 shown in FIG. 3 can also be used, the sensor housing of which has a cutout into which a measuring cell receptacle designed in the case as a separate component, such as the measuring cell receptacle 3 shown in FIG. 2 and in FIGS. 4-7, is insertable or inserted.

In both cases, the sensor housing 73 comprises, for example, at least one inner chamber 75, 77 in which at least one component 5c, 5d of the measuring apparatus 5' is arranged. FIG. 3 shows, as an example, the component 5c arranged here in the inner chamber 75 of the sensor housing 73 and comprising the transmitting apparatus 25, and the component 5d arranged in the inner chamber 77 of the sensor housing 73 and comprising at least the detector 27, and possibly also the evaluation apparatus 31 connected to the detector 27. In this case, the transmitting apparatus 25 also serves here to transmit transmitted radiation through the opening 29 of the side element 17, adjacent to the inner chamber 75, or the window inserted therein, and the detector 27 serves to receive measurement radiation exiting through the opening 29 of the side element 17, adjacent to the inner chamber 77, or the window inserted therein.

A further optional embodiment consists in that the measuring cell receptacle 3 has a fastening device for fastening the measuring cell receptacle 3 at an installation location. FIG. 2 show by way of example bores 79 running through the base element 19 for receiving fastening screws 81, by means of which bores the base element 19 can be fastened to a carrier 83 (shown in FIG. 2) that is provided at the installation location. The fastening device offers the advantage that it prevents slippage of the measuring cell receptacle 3, 3' during the insertion and/or clamping of the measuring cell 1, and therefore improves the handling, in particular while inserting and/or clamping the measuring cell 1, as well as during a replacement of the measuring cell 1. This fastening device can also be used analogously in FIG. 3. There, it offers the advantage that fastening the measuring cell receptacle 3' designed as a component of the sensor effects a fastening of the measuring device 200 designed as a sensor.

The invention claimed is:

1. A measuring device for measuring at least one measurand of a medium, the measuring device comprising:
a measuring cell including a measurement chamber, which is configured to enable the medium to flow therethrough or configured to be filled with the medium, and a reference chamber, which is separate from the measurement chamber and is fillable or filled with a reference medium;
a measuring cell receptacle configured to hold the measuring cell; and
a measuring apparatus configured to measure the at least one measurand of the medium,
wherein the measurement chamber and the reference chamber are arranged relative to each other such that the measuring cell is insertable into the measuring cell receptacle in a measuring position and in a reference position, wherein:
when in the measuring position, measurements of the at least one measurand of the medium disposed in the measurement chamber or flowing through the measurement chamber are enabled using the measuring apparatus; and
when in the reference position, reference measurements of at least one reference variable of the reference medium disposed in the reference chamber are enabled using the measuring apparatus.

2. The measuring device according to claim 1, wherein, at least one of:
the measuring cell is configured such that a measurement chamber axis, which extends through the measurement chamber of the measuring cell, extends parallel to a reference chamber axis, which extends through the reference chamber of the measuring cell, and wherein the reference chamber axis is spaced apart from the measurement chamber axis in a first direction extending parallel to a longitudinal axis of the measuring cell by a first distance and/or in a second direction extending perpendicular to the longitudinal axis of the measuring cell by a second distance; and
the measuring cell receptacle includes an inner chamber, at least partially delimited by two side elements arranged opposite each other and by a base element of the measuring cell receptacle, in which inner chamber the measuring cell is insertable or inserted into the measuring cell receptacle through an opening, opposite the base element, of the measuring cell receptacle.

3. The measuring device according to claim 2, wherein at least one of the two side elements includes an opening arranged such that the measurement chamber axis extends through the opening, or a through window inserted into the opening, when the measuring cell is arranged in the measuring position in the measuring cell receptacle, and such that the reference chamber axis extends through the opening, or through the window inserted into the opening, when the measuring cell is arranged in the reference position in the measuring cell receptacle.

4. The measuring device according to claim 2, wherein the measuring cell and the measuring cell receptacle, including the base element, are configured such that the measuring cell, in the measuring position, is arranged in the measuring receptacle at a measuring insertion depth specified for the measuring position and, in the reference position, is arranged in the measuring receptacle at a reference insertion depth specified for the reference position, which reference insertion depth different than the measuring insertion depth.

5. The measuring device according to claim 2, wherein:
a first upper side of a first region of the measuring cell is arranged offset in the second direction relative to a second upper side of a second region of the measuring cell such that a third distance between the first and second upper sides of the first and second regions, respectively, in the second direction corresponds to the second distance of the measurement chamber axis from the reference chamber axis in the second direction;
wherein first upper side and second upper side face away from the base element in a state inserted into the measuring cell receptacle; and
wherein the first region includes the measurement chamber, and the second region includes the reference chamber.

6. The measuring device according to claim 1, wherein an underside of the measuring cell, the underside facing a base element of the measuring cell receptacle when the measuring cell is inserted into the measuring cell receptacle, and an inner side of the base element, the inner side facing the measuring cell when the measuring cell is inserted into the measuring cell receptacle, each include complementary shapes configured as to:
effect a form-fit connection between the measuring cell, disposed at a measuring insertion depth in the measuring cell receptacle, and the measuring cell receptacle, in particular the base element, when the measuring cell is inserted in the measuring position; and/or
effect a form-fit connection between the measuring cell, disposed in the measuring cell receptacle at a reference insertion depth, and the measuring cell receptacle, in particular the base element, when the measuring cell is inserted in the reference position.

7. The measuring device according to claim 1, wherein:
the measuring cell comprises, on its underside facing a base element of the measuring cell receptacle when the measuring cell receptacle is in an inserted state, cell plug-in connector elements configured as locating pins, projections, recesses, cutouts, or blind holes;
the base element comprises first base plug-in connector elements arranged complementary to the cell plug-in connector elements of the measuring cell and disposed on an inner side of the base element, the first base plug-in connector elements configured as cutouts, blind holes, recesses, projections, or locating pins;
wherein the cell plug-in connector elements are configured and arranged as to engage the first base plug-in connector elements in a form-fit when the measuring cell is or is being introduced into the measuring cell receptacle in the measuring position;
wherein the measuring device is configured such that:
the cell plug-in connector elements of the measuring cell, in cooperation with the first base plug-in connector elements, complementary thereto, effect a measurement insertion depth, specified for the measuring position, of the measuring cell in the measuring cell receptacle, when inserting the measuring cell in the measuring position; and/or
the measuring cell and the measuring cell receptacle either:
are configured such that, when introducing the measuring cell in the reference position, the cell plug-in connector elements of the measuring cell interact with second base plug-in connector elements of the base element, which are complementary to the cell plug-in connector elements and are arranged offset relative to the first base plug-in connector elements to effect a reference insertion depth, specified for the reference position, of the measuring cell in the measuring cell receptacle; or are configured such that, when introducing the measuring cell in the reference position, the measuring cell comprises a second set of cell plug-in connector elements, which set is arranged offset relative to the cell plug-in connector elements of the measuring cell and, in cooperation with the first base plug-in connector elements of the base element, effects a form-fit connection between the measuring cell and the measuring cell receptacle and/or the reference insertion depth of the measuring cell in the measuring cell receptacle.

8. The measuring device according to claim 1, further comprising a clamping device configured to selectively clamp the measuring cell in the measuring position and in the reference position in the measuring cell receptacle.

9. The measuring device according to claim 8, wherein the clamping device comprises a transverse clamping device with a clamping element and a counter bearing formed by a base element of the measuring cell receptacle, wherein the clamping element is configured such that the clamping element:
is movable into a starting position, in which the clamping element releases the opening of the measuring cell receptacle, which enables introducing the measuring cell through the opening into the measuring cell receptacle, and
is movable and releasably fixed in a clamping position by a fastener such that the clamping element, when the measuring cell is inserted in the measuring position, exerts a clamping force on the measuring cell in a direction facing the measurement chamber and extending perpendicular to the measurement chamber axis and, when the measuring cell is inserted in the reference position, exerts a clamping force on the measuring cell in a direction facing the reference chamber and extending perpendicular to the reference chamber axis.

10. The measuring device according to claim 9, wherein:
the fastener for releasably fixing the clamping element in the clamping position includes at least one mechanical latching device, at least one closing system, at least one locking system, and/or at least one screw adapted to be screwed into one of two side elements through an end region of the clamping element, the at least one screw equipped with a rotary knob, wherein the two side elements at least partially delimit an inner chamber of the measuring cell receptacle; and/or
the clamping element is configured:
as a bracket whose one end region is rotatably connected to one of the two side elements via a hinge and whose opposite end region opposite the hinge is fastened or fastenable in the clamping position to the other side element by the fastener; or
as a cover whose two opposite end regions are each fastened or fastenable to one of the two side elements by the fastener.

11. The measuring device according to claim 8, wherein the measuring cell further comprises a spring system operative to clamp the measuring cell in the measuring position by the clamping device in at least one clamping direction, relative to a measurement chamber axis of the measurement chamber, in the measuring cell receptacle, wherein the spring system comprises at least one of:

at least one spring;
at least one spring configured in each case as a transverse spring that enables the measuring cell to be clamped in the measuring cell receptacle in a transverse clamping direction extending perpendicular to the measurement chamber axis; and
at least one spring configured in each case as an axial spring that enables the measuring cell to be clamped in the measuring cell receptacle in an axial clamping direction extending parallel to the measurement chamber axis.

12. The measuring device according to claim 1, wherein the measuring cell, at least one of:
is configured as a flow measuring cell, as a disposable measuring cell, and/or as an exchangeable measuring cell;
comprises a measuring cell body manufactured from a plastic and/or from a sterilizable material; and
comprises a measuring cell body configured in one piece and/or as an injection-molded part.

13. The measuring device according to claim 1, wherein:
the measuring device has a modular configuration such that the measuring apparatus comprises at least one module which is in each case fastenable or fastened on an outer side of one of two side elements at least partially delimiting an inner chamber of the measuring cell receptacle; or
the measuring device is configured as a sensor comprising a sensor housing, wherein:
the sensor housing includes at least one inner chamber in which at least one component of the measuring apparatus is arranged in each case; and
the sensor housing either includes a cutout into which the measuring cell receptacle is insertable or inserted or includes the two side elements and housing regions forming the base element of the measuring cell receptacle.

14. The measuring device according to claim 1, wherein the measuring apparatus, at least one of:
is operable as an optical measuring apparatus and/or as a measuring apparatus for measuring a turbidity of the medium, as a measuring apparatus for measuring a solid concentration contained in the medium, as a fluorescence measuring apparatus, or as an absorption measuring apparatus for measuring a spectral absorption coefficient or a concentration of an analyte contained in the medium;
comprises a transmitting apparatus disposed on an outer side of a first of two side elements at least partially delimiting an inner chamber of the measuring cell receptacle and configured to transmit transmitted radiation into the measurement chamber when the measuring cell is inserted into the measuring cell receptacle in the measuring position and into the reference chamber when the measuring cell is inserted into the measuring cell receptacle in the reference position;
comprises a detector disposed on an outer side of a second of two side elements opposite the first side element, which detector is configured to:
receive measuring radiation emerging from the measurement chamber when the measuring cell is inserted into the measuring cell receptacle in the measuring position;
determine and provide a measuring signal dependent upon the at least one measurand;

receive measuring radiation emerging from the reference chamber when the measuring cell is inserted into the measuring cell receptacle in the reference position; and determine and provide a measuring signal dependent upon the at least one reference variable of the reference medium; and comprises an evaluation apparatus is connected to the detector and configured to determine and provide:

a measurement result of the at least one measurand based on the measurement signals from the detector when the measuring cell is inserted into the measuring cell receptacle in the measuring position; and a measurement result of the at least one reference variable based on the measurement signals from the detector when the measuring cell is inserted into the measuring cell receptacle in the reference position.

15. The measuring device according to claim 1, wherein the measuring cell:

as a whole consists of a transparent material; or in at least one or each of two outer walls of the measurement chamber, the two outer walls being opposite each other along the measurement chamber axis:

a transparent window is disposed; or a window mount equipped with a window is insertable or inserted, wherein the window mount:

is insertable or inserted at an installation depth, which is selectable from at least two different installation depths, into a cutout extending through the outer wall; and/or includes a number of radially outward projecting projections by which the window mount is insertable or inserted at the installation depth, which is selectable from at least two different installation depths, into the cutout extending through the outer wall, wherein a wall of the measuring cell, which surrounds the cutout on all sides, includes on its inside for each selectable installation depth in each case a set of contact surfaces corresponding to the number of projections, wherein the contact surfaces of each set are arranged distributed around the cutout in a radial direction with respect to a longitudinal axis of the cutout such that the projections of the window mount rest on the contact surfaces of the respective set and are arranged in an axial direction such that the window mount is arranged in the cutout at the installation depth assigned to the respective set of contact surfaces when the projections thereof rest on the contact surfaces of the respective set of contact surfaces.

16. The measuring device according to claim 1, wherein, at least one of:

the reference medium is a liquid medium, or a solid medium, having known properties, a known composition, and/or a known value of each measurand;

at least one or each of two outer walls of the reference chamber opposite each other along the reference chamber axis consists of a transparent material in each case, or a transparent window is inserted into at least one or each of the two outer walls of the reference chamber; and the reference chamber:

is connected to at least one connection via which the reference medium is introduced into the reference chamber and/or is removed from the reference chamber;

is configured as a chamber filled with the liquid reference medium at a manufacturing site of the measuring device and is then permanently closed; or includes an opening through which the solid reference medium is insertable or inserted into the reference chamber.

17. A measuring cell configured to be insertable into the measuring device according to claim 1, the measuring cell comprising:

the measurement chamber; and the reference chamber, separate from the measurement chamber and fillable or filled with the reference medium, wherein the measurement chamber and the reference chamber are arranged relative to each other such that the measuring cell is insertable into the measuring cell receptacle of the measuring device in a measuring position, in which measurements of the at least one measurand of the medium disposed in the measurement chamber or flowing through the measurement chamber are performed by the measuring apparatus of the measuring device, and such that the measuring cell is insertable into the measuring cell receptacle of the measuring device in a reference position, in which reference measurements of at least one reference variable of the reference medium located in the reference chamber are performed by the measuring apparatus of the measuring device.

* * * * *